United States Patent [19]
Kochis et al.

[11] Patent Number: 5,381,020
[45] Date of Patent: Jan. 10, 1995

[54] HAND-HELD OPTICAL SCANNER WITH ONBOARD BATTERY RECHARGING ASSEMBLY

[75] Inventors: Richard L. Kochis, Fort Collins; Eric F. Aas, Windsor, both of Colo.

[73] Assignee: Hewlett-Packard Company, Palo Alto, Calif.

[21] Appl. No.: 40,817

[22] Filed: Mar. 31, 1993

[51] Int. Cl.⁶ .................................................. G06K 7/10
[52] U.S. Cl. .................................... 250/566; 358/473
[58] Field of Search ............................... 250/566–568, 250/221; 235/462, 472; 358/473

[56] References Cited
U.S. PATENT DOCUMENTS 4,703,186  10/1987  Nakayama et al. .
4,709,144  11/1987  Vincent .
4,819,083   4/1989  Kawai et al. ........................ 358/473
4,870,268   9/1989  Vincent et al. .
4,894,523   1/1990  Chadima et al. ................... 235/472
4,926,041   5/1990  Boyd .

Primary Examiner—David C. Nelms

[57] ABSTRACT

A hand-held optical scanner comprising a hand-displaceable scanner housing; scanner electrical components mounted within the housing for performing scanner operating functions; a battery disposed in the housing and electrically connected to the electrical components; a generator disposed in the housing and operatively associated with the battery; and a roller assembly mounted in the housing and drivingly linked to the generator.

12 Claims, 6 Drawing Sheets

HAND-HELD OPTICAL SCANNER WITH ONBOARD BATTERY RECHARGING ASSEMBLY

BACKGROUND OF THE INVENTION

The present invention relates generally to hand-held optical scanners and, more particularly, to battery-powered, hand-held optical scanners in which the battery is charged by a generator assembly.

Optical scanners are used to produce machine-readable data which is representative of a scanned object, e.g. a page of printed text. Optical scanners employ line-focus systems to image scanned objects.

In a line-focus system, a light beam from an illuminated line object is imaged by a lens on a linear photosensor array which is positioned remotely from the line object. In an optical scanning device, the illuminated line object of the line-focus system is commonly referred to as a "scan line". The linear photosensor array is a single dimension array of photoelements which correspond to small area locations along the line object. These small area locations on the line object are commonly referred to as "picture elements" or "pixels". In response to light from its corresponding pixel location on the line object, each photoelement produces a data signal which is representative of the intensity of light which is impinged upon it. All of the photoelement data signals are received and processed by an appropriate data processing system which may subsequently store the data on a suitable medium or generate a display signal therefrom for reproducing an image of the object with a display device such as a CRT or printer.

Optical scanners and various components thereof are disclosed in U.S. Pat. No. 4,926,041 for OPTICAL SCANNER of David Wayne Boyd; U.S. Pat. No. 4,709,144 for COLOR IMAGER UTILIZING NOVEL TRICHROMATIC BEAM SPLITTER AND PHOTOSENSOR of Kent J. Vincent; and U.S. Pat. No. 4,870,268 for COLOR COMBINER AND SEPARATOR AND IMPLEMENTATIONS of Kent J. Vincent and Hans D. Neuman, which are each hereby specifically incorporated by reference for all that is disclosed therein.

A hand-held optical scanner is an optical scanner which is moved across a scanned object, e.g. a page of text, by hand. Most hand-held scanners have to date been powered by an external power source such as a power unit connected to a wall cutlet and in turn connected to the hand scanner by an electrical cable. Such external power sources have been deemed necessary due to the significant electrical energy required to operate the various scanner components. For example, the optical imaging assembly of a scanner typically comprises an illumination source such as a fluorescent bulk. The scanner photoelectric conversion assembly (typically a CCD) requires electrical energy as do the scanner speed detection circuitry and the scanner central processing unit. In the hand-held scanner of one preferred embodiment of the present invention, an onboard hard disk storage device is employed which also requires electrical energy to operate. It would be generally desirable to provide a hand-held scanner with an onboard power source and mass data storage assembly to eliminate the need for an external power connection or other connecting cables which "tether" the scanner to a fixed location. Such an arrangement would significantly improve the mobility and potential use applications for a hand scanner. However, one significant obstacle which must be overcome is the relatively short period of operation resulting from the use of an onboard power supply.

U.S. Pat. No. 4,703,186 of Nakayama et al., which is hereby specifically incorporated by reference for all that it discloses, describes a hand-held optical scanner with a speed control device. Several different speed control embodiments are described. In one embodiment, a friction disk is mechanically linked to a guide roller which rotates as the scanner is moved across a document. The friction disk is constructed to expand and move into frictional contact with a housing and thus produce a load resisting scanning motion when scanning speed exceeds a predetermined speed. In another embodiment, a flywheel and a rotating weight which moves radially outwardly relative to its rotation axis with increased scanning speed is employed to limit scanning speed and maintain a relatively smooth scanning speed. In another embodiment, the scanning unit is moved along a guide rail. An associated guide roller rotates, and thereby a DC motor is rotated in the reverse direction. "Then, the DC motor functions as a generator which produces a load practically proportional to the revolving rate thereof. The load thus produced tends to maintain the revolving rate of the guide roller at a fixed value, which controls the moving speed of the scanning unit for an approximate uniform motion."

Nakayama et al. thus describes certain methods for limiting scanning speed including use of a generator, but does not consider using electrical energy which is generated to charge a scanner battery.

SUMMARY OF THE INVENTION

The present invention is directed to a hand-held optical scanner which comprises a plurality of electrically-powered operating components such as an optical imaging assembly and an optical sensor assembly, which are disposed within a hand displaceable housing. A battery for supplying electrical energy to the operating components of the scanner is also mounted within the scanner housing. A generator is mounted within the housing and is operably connected to the battery for supplying electrical energy thereto. A roller assembly is rotatably mounted on the housing in a manner such that the roller assembly is caused to rotate through displacement of the scanner by the operator in a hand scanning operation. The roller assembly is drivingly linked to the generator and provides mechanical energy thereto which the generator converts to the electrical energy which it supplies to the battery.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
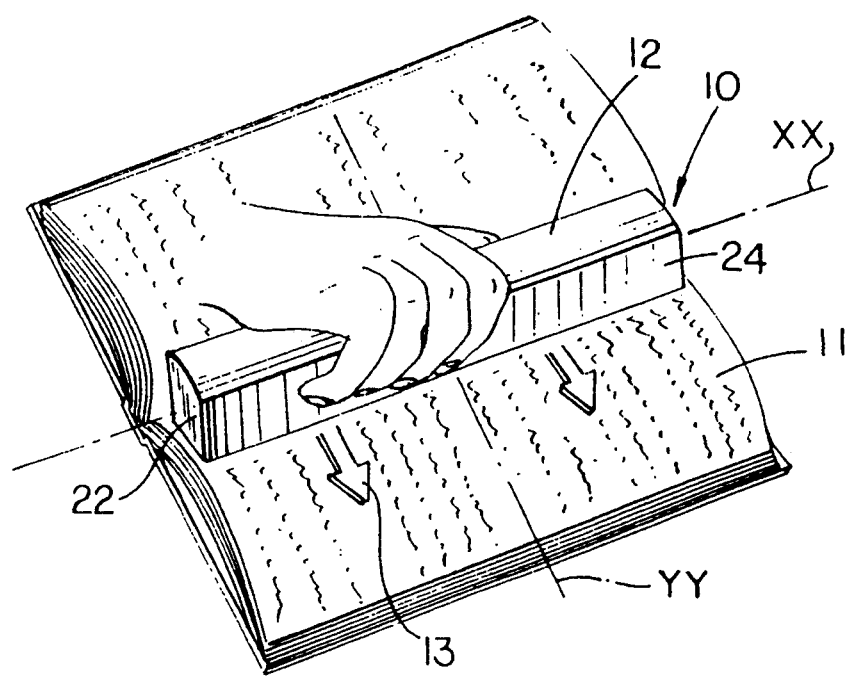
FIG. 1 is a perspective view of a hand-held optical scanner being used to scan the pages of a book.
Figure 2:
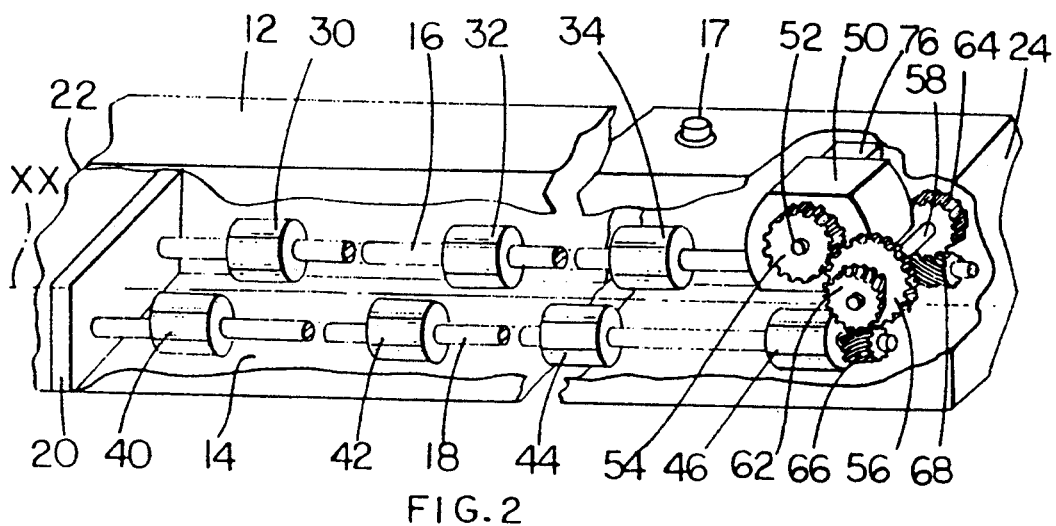
FIG. 2 is a partially cut away perspective view of a hand-held optical scanner housing, drive motor, drive rollers and mechanical linkage.
Figure 5:
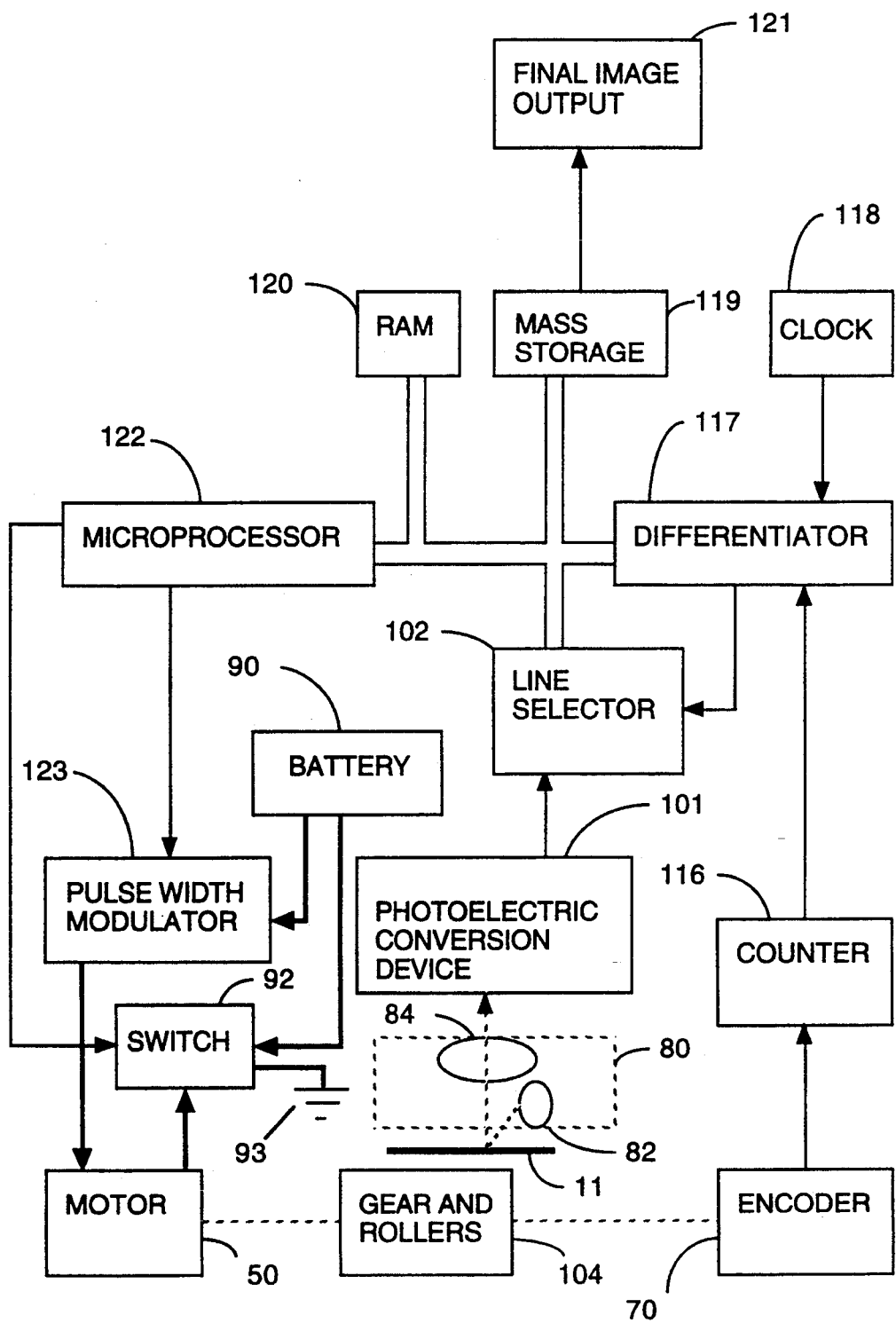
FIG. 5 is a block diagram showing basic operating components of a hand-held scanner provided with a speed control system.

FIGS. 1, 2 and 5 illustrate various components of a hand-held optical scanner 10 which comprises an optical sensor assembly (photoelectric conversion device) 101 for generating a data signal representative of a scanned object 11 such as the page of a book. The scanner has a housing 12 which supports the optical sensor assembly 80.

A drive roller assembly 30, 32, 40, 42, etc. is operably mounted on the scanner housing 12 and enables the housing 12 to be rollingly displaced across an object 11 in a predetermined scan direction 13. A displacement sensing device, such as an encoder unit 70, senses the angular displacement of the drive rollers and generates a signal representation thereof. A motor 50 is drivingly linked to the drive rollers 30, 32, etc. for applying driving torque thereto. A control assembly actuates the motor 50 for angularly accelerating and decelerating the drive rollers so as to provide tactile feed back to urge an operator to hand displace the housing 12 across the scanned object 11 within a predetermined speed range which is optimal for scanning. The speed range is preferably selected to be a relatively small speed range just below the maximum scanning speed at which the unit can operate properly based upon the operating interval of the optical sensor assembly (photoelectric conversion device) 101.

Having thus described the invention in general, certain preferred embodiments of the invention will now be described in detail.

FIG. 1 illustrates a hand-held optical scanner 10 being used to scan a scan object 11 such as the page of a book. As illustrated in FIGS. 1 and 2, the hand-held optical scanner has an elongate, generally box-shaped housing 12 with an open or transparent bottom face 14. The housing has a central longitudinal axis XX extending in a direction parallel to scan lines on the object which are imaged and perpendicular to a scanning direction 13 (the direction in which the scanner is moved during a scanning operation). The scanner has a central lateral axis YY extending perpendicular to the longitudinal axis XX.

A scan on/off switch 17 may be provided on the housing or may be incorporated into a roller suspension system (not shown) such that the scanner is enabled for scanning by application of downward force to the scanner by the operator.

A pair of rotatable shafts 16, 18 extending parallel to central longitudinal axis XX are rotatably supported by support blocks 20 ("only one shown") which are fixedly mounted at opposite end portions 22, 24 of the housing. A plurality of rollers 30, 32, 34, 40, 42, 44, 46 are fixedly attached to the shafts 16, 18 so as to rotate therewith. The rollers may be constructed from rubber, plastic or other suitable material having a coefficient of friction sufficient to non-slippingly engage the surface of a paper document during scanning displacement under normal operating conditions. However, the coefficient of friction of the rollers is sufficiently low so that the rollers will slide on the paper document under certain high speed or high acceleration operating conditions described in detail below.

A motor 50 is fixedly mounted within the housing 12. The motor has a rotatable drive shaft 52 which, in the illustrated embodiment, is arranged parallel to housing axis YY. The motor 50 may be a DC motor of a type commercially available such as that sold under the product designation Model no. 16.11,182 by Buehler Products, Inc., P.O. Box 33400, Raleigh, N.C. A drive shaft gear 54 is fixedly attached to the drive shaft 52 and engages a gear 56 which is fixedly attached to a laterally disposed shaft 58 which may be journaled to forward and rear support blocks (not shown) which are fixedly associated with forward and rear portions of the housing. Identical gears 62, 64 are fixedly mounted on opposite ends of shaft 58 and are drivingly engaged with identical gears 66, 68 fixedly mounted on shafts 16 and 18, respectively. Drive shafts 16 and 18 are thus rotated by the DC motor in the same direction at identical angular velocities which are directly proportional to the angular velocity of DC motor drive shaft 52.

A conventional encoder unit 70 is operably associated with motor drive shaft 52 or another shaft, such as 58, 16, 18 of the drive system and provides a pulsed encoder output signal which is representative of angular displacement of drive rollers 30, 32, 40, 42, etc.

An optical assembly 80, shown schematically in FIG. 5, is situated within the housing and has an elongate scanning head (not shown) which may be of conventional construction and which is positioned between drive shafts 16, 18 extending parallel thereto. The optical assembly comprises a light source 82 in the scanning head which illuminates a current scan line portion of the document which is being scanned. The optical assembly also comprises an imaging assembly 84, which may comprise a conventional scanner lens assembly, which images the current scan line onto the image plane of a photoelectric conversion device 101 such as a conventional CCD array.

Figure 3:
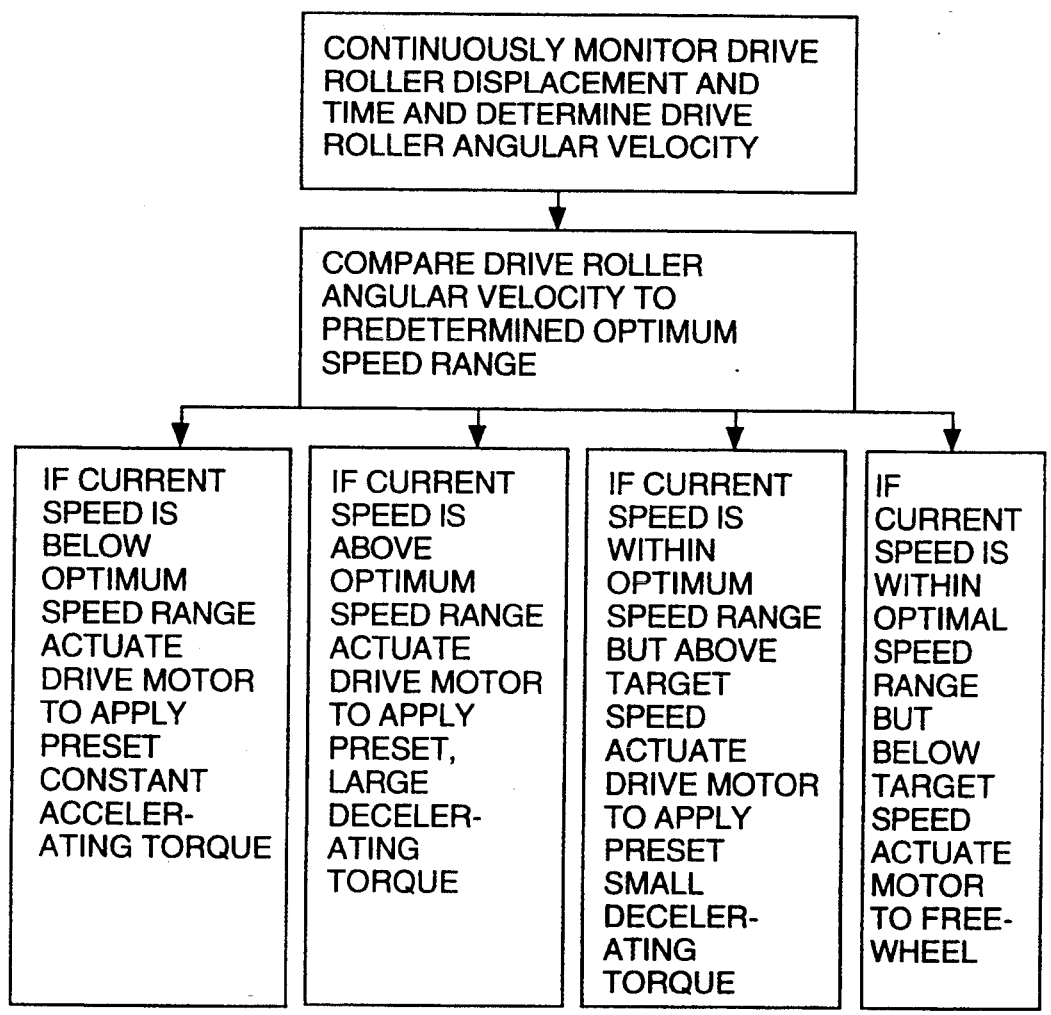
FIG. 3 is a block diagram showing basic control functions of a hand-held scanner speed control system of one embodiment.
Figure 6:
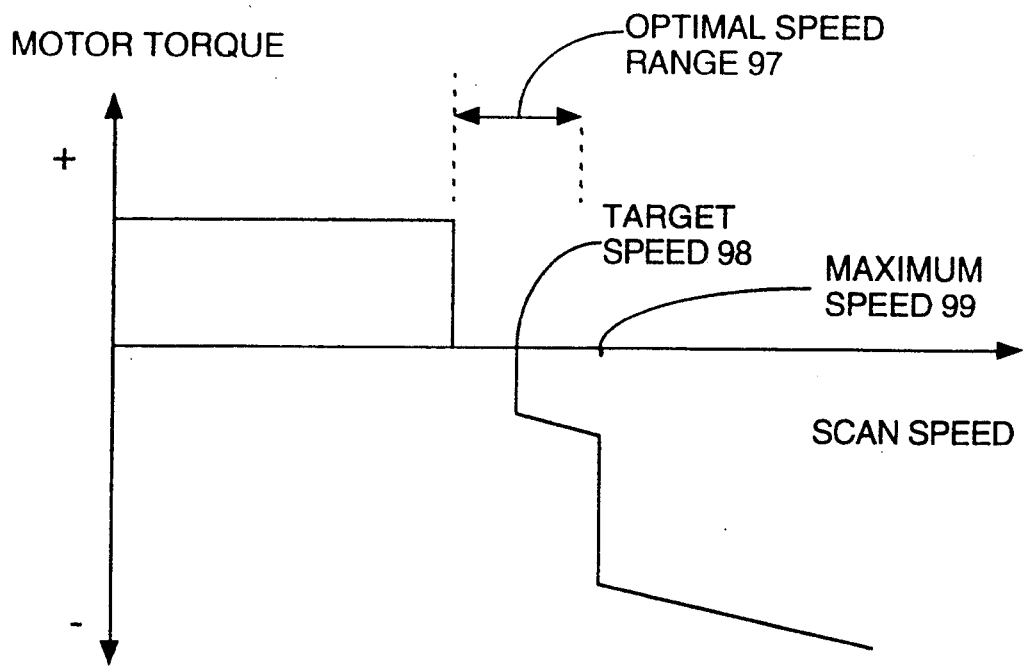
FIG. 6 is a grayish illustrating applied motor torque as a function of scanning speed according to the control philosophy of FIG. 3.

FIGS. 3 and 6 illustrate the basic operations performed by the scanner speed control system of one embodiment. During any scan, the amount of angular displacement of the drive rollers is continuously monitored by use of encoder 70 and associated counter 116, FIG. 5. The first time derivative of roller angular displacement, i.e. angular velocity, is determined by use of signals from counter 116 and clock 118.

As further illustrated in FIG. 3, DC motor 50 is actuated to apply torque of a preselected value (either positive, or negative, or zero) to drive rollers 30, 40, etc. based upon a comparison of the current value of roller angular velocity to a predetermined optimal speed range 97. The optimal speed range 97 is a relatively small speed range which encompasses a target speed 98 which is slightly less than the maximum speed 99 at which the scanner can operate based upon the sampling rate of the photoelectric conversion device. As a typical example, the target speed 98 may be 95% of the maximum speed 99 and the optimal speed range 97 may extend from 90% of maximum speed 99 to 99% of maximum speed 99.

In this embodiment, the drive motor 50 is actuated to apply an accelerating torque to the drive rollers whenever the drive rollers are being moved at a speed below the preselected optimal range 97 of scanning speeds. The motor is actuated to apply zero torque to the drive rollers within the preselected optimal range 97 of scanning speeds. The motor is actuated to apply a constant smaller decelerating torque when the scanner rollers are moved at a speed above target speed, but within the preselected optimal range. A constant relatively high decelerating torque is applied at scanning speeds above the optimal range 97. Variations of this general control philosophy are used in more complex embodiments of the invention to anticipate potential overshoots and undershoots of the optimal speed range, such as discussed below.

Figure 4:
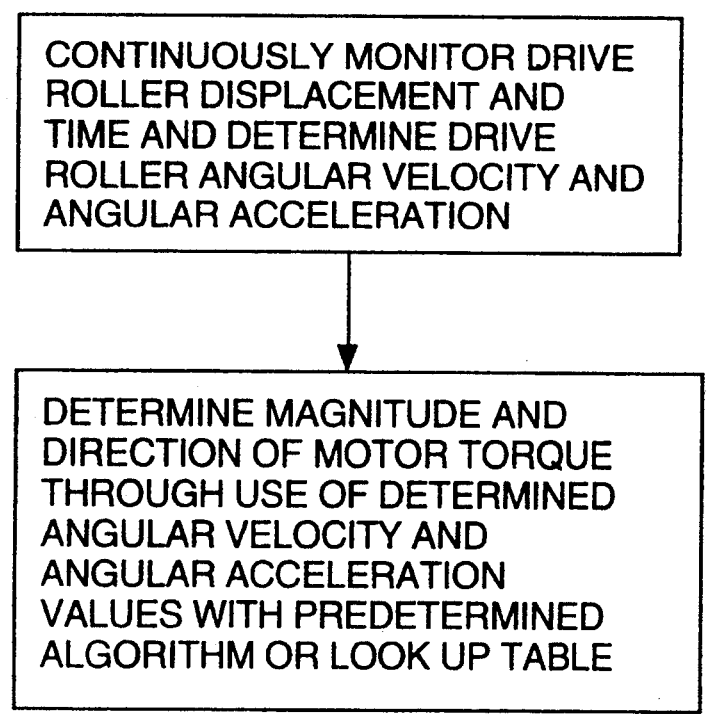
FIG. 4 is a block diagram showing basic control functions of a hand-held scanner speed control system of a second embodiment.
Figure 7:
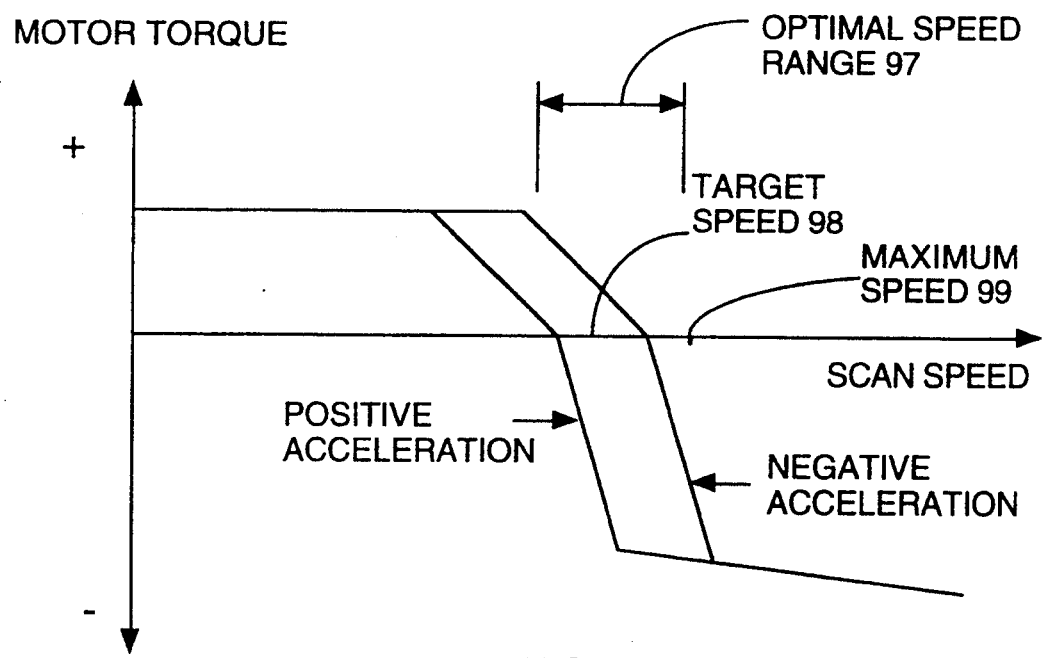
FIG. 7 is a graph illustrating one example of applied motor torque as a function of scanning speed according to the control philosophy of FIG. 4.

In the embodiment of FIGS. 4 and 7, the signals from encoder 70 and clock 118 are used to determine both the first and second time derivatives of roller displacement, i.e. the angular velocity and angular acceleration of the drive rollers. The current velocity and acceleration values are then both used to determine the magnitude and direction of motor torque to be applied to the drive rollers. The velocity and acceleration values may be applied to a predetermined algorithm or look-up table to determine the drive motor torque to be applied. As the result of using acceleration as well as velocity in determining motor response, it may be seen from FIG. 7 that a central envelope is produced in the roller speed region near the optimal speed range 97. In that envelope the leading (right edge) represents the motor torque response when the operator is applying a substantial negative acceleration force to the scanner and the trailing (left) edge represents the motor torque response when the operator is applying a substantial accelerating force to the scanner. The use of acceleration as a control variable increases the effectiveness of the motor response in maintaining the operator within the optimal speed range. Further, time derivatives of displacement could also be used in a speed control system but are unlikely to significantly increase control system effectiveness.

It has been discovered by applicant that it is desirable, when operating at a speed range below the optimal speed range, to apply a constant value accelerating torque until the scanner reaches or nearly reaches the optimal scanning speed range. The constant value accelerating torque which is applied should be sufficiently low to enable an operator to override the torque in the event that he wishes to slow or stop the scanning operation. Applicant has discovered that such a combination of features in the low speed range provide a hand scanner which allows a user to feel in control and thus feel comfortable with the scanner. In order to apply a constant torque output, the current speed and acceleration of the motor and associated inertia of the system are first determined and then a conventional motor control algorithm or look-up table may be used to determine the energy which must be applied. Since motor speed is directly proportional to roller speed, a microprocessor may use this value to determine the needed input energy. The amount of energy input to the motor may be controlled by varying the voltage of the associated motor power source or, as described below, by pulsing a constant voltage energy supply to effectively provide a variable voltage.

It is another general feature of the control system that as the operator approaches a speed equal to the maximum functional scanning speed of the hand scanner, that a torque is applied which is sufficiently large to prevent the operator from exceeding the maximum scanning speed. If the operator attempts to accelerate the scanner beyond the maximum scanning speed, the reverse torque applied by the DC motor is sufficiently large to cause the rollers of the scanner to skid on the surface of the document being scanned when a normal amount of downward pressure is being applied to the scanner by the weight of the operator's hand.

Having thus described the operation of the control system in general, various specific components and functions thereof will now be described in further detail.

FIG. 5 shows a block diagram of the speed control system of the hand-held scanner of FIG. 1. A DC motor 50 is responsive to a voltage supplied from a battery 90 through a pulse width modulator 123 and supplies an angular velocity to the gear and roller assembly 104 which act to move optical assembly 80 and photoelectric conversion device 101 along the document 11 to be copied. The photoelectric conversion device 101 is an image receiving device such as a charge coupled device (CCD). A CCD operates to generate a data signal representative of optical images which are impinged thereon during successive operating intervals. Thus, a "picture" of a small portion of a scanned document (a scan line) is "taken" during each operating interval. The data signal is therefore representative of a series of pictures of scan line portions of a document which are generated as the scanner 10 is moved across the document. A typical CCD image sensing device takes a "picture" of the document approximately every millisecond. It will be readily apparent that the speed at which the hand-held scanner is moved across the document is critical because it determines the effective width of each scan line for which data is generated. If the scanner is moved too quickly, erratically or in reverse, information from the document will be lost. If the scanner is moved too slowly, redundant information will be gathered with a resulting loss in scanner performance. Therefore, the objective of the speed control system on the hand-held scanner is to urge the user to maintain an optimal forward speed. To this end, the speed control system must sample drive roller velocity and preferably, also drive roller acceleration, process this data and supply a positive or negative voltage to the motor, such that the torque produced by the motor helps the operator adjust the speed of the scanner.

In the preferred implementation, the movement of the scanner is tracked by means of a quadrature encoder 70 which is designed to provide two pulses that are 90 degrees out of phase. In one preferred embodiment, the encoder resolution and the drive gear ratio and roller circumference are such that the first pulse or the A pulse provides a rising edge every 13.123 mm of scanner travel which is the scan rate along a document for best image transfer results. The second pulse or the B pulse maintains and increments a 16 bit position counter 116 on every rising edge of the A pulse when the scanner is moving forward. The B pulse counter will de-increment on the falling edge of the A pulse when the scanner is moving backward, which should ordinarily not happen. At the beginning of every scan, the position counter will be reset. As long as a scan switch (provided in microprocessor software or associated firmware) is closed, A pulses will be counted. When the scan switch is open, A pulses will not be counted. Thus, the quadrature encoder acts as a position displacement counter and direction indicator.

A counter 116 will measure the time between A pulses. The counter 116 may run at about 200 kHz and will reset on the rising edge of the A pulse when the scanner is moving forward. If the scanner is moving in reverse, the counter will be reset on the falling edge of the A pulse. The counter value is then differentiated once to obtain velocity and twice to obtain acceleration. The differentiation is conducted by the differentiator 117. The position, direction, velocity and/or acceleration are then stored in RAM 120.

It should again De noted at this point, that if the tactile feedback control system uses a stair-step approximation approach as in FIG. 6, the acceleration will not be calculated and no allowance will be made for the acceleration of the scanner. Such a system would regulate the user's speed, but may over or under shoot the target speed when the user applies too much or too little force during the scan. By reacting to acceleration as well as velocity, the overshoot can be minimized and a target speed can be selected which is closer to the maximum scan speed. The target speed should be set to slightly less than the maximum speed that the photoelectrical conversion device 11 is capable of processing data. Then, any minor overshoot of target speed will not result in the loss of data.

Next, a digital signal processor or microprocessor 122 retrieves the velocity or velocity and acceleration information and converts these values to motor angular velocity and motor angular acceleration through use of an appropriate algorithm or look-up table. In one embodiment, angular velocity at count zero ($W_0$) is 13.123 mm times the gear ratio between drive shafts 16, 18 and motor drive shaft 52 divided by the velocity at count zero ($V_0$) times 4.571 μs times the roller radius.

$$\text{Angular Velocity } (W_0) = \frac{13.123 \text{ mm} \times \text{Gear Ratio}}{V_0 \times 4.571 \text{ μs} \times \text{Roller Radius}}$$

The angular acceleration at count zero ($a_0$) is the angular velocity at count zero ($W_0$) minus the angular velocity at the previous count ($W_{-1}$) divided by the velocity at count zero ($V_0$) times 4.571 μs.

$$\text{Angular Acceleration } (a_0) = \frac{W_0 - W_{-1}}{V_0 \times 4.571 \text{ μs}}$$

Both of the above conversions can be performed more efficiently by the microprocessor 122 via a look-up table.

The microprocessor will then calculate the voltage required to provide a preselected torque from the motor to provide tactile feedback to the operator so that he may be urged to operate the scanner at near the target speed. However, in one preferred embodiment, rather than performing the time consuming calculations necessary for this step, "fuzzy logic" is applied and then a table look-up operation is performed to find the desired torque voltage. Fuzzy logic is a control system whereby the designer establishes rules and tables such that a given velocity and acceleration will produce a predetermined torque voltage. Fuzzy logic reduces the amount of math required by the microprocessor, thus the microprocessor design and programming are simpler. Also, the response time is greatly enhanced with fuzzy logic.

Once a torque voltage for accelerating or decelerating the scanner is determined, the value must be converted to the effective voltage that will be supplied to the motor. To this end, a pulse width modulator (PWM) 123, capable of storing 256 discrete values, may regulate the effective voltage and voltage polarity seen by the motor. A pulse width modulator supplies a pulsed voltage and acts like a voltage regulator without losing voltage or overheating as a typical voltage regulator.

If, for example, the maximum voltage available to the motor is determined to be 12 volts, the voltage provided to the motor ($V_{motor}$) is calculated by multiplying $N_{0-255}$ by 12 (maximum motor voltage) and dividing by 255, which results in a number 0–12.

$$V_{motor} = \frac{N_{0-255} \times 12}{255}$$

where the number No. 555 is a number between 0 and 255, which was calculated by the microprocessor after the motor voltage was determined. $N_{0-25}$ is calculated by multiplying the torque constant (K) of the motor by the angular velocity at count zero ($W_0$) and adding the torque voltage ($V_{motor}$).

$$\text{Number } (N_{0-255}) = K \times W_0 + V_{motor}$$

After the motor voltage ($V_{motor}$) is calculated, the microprocessor programs the pulse width modulator with an appropriate duty cycle based upon this calculated motor voltage. An appropriate switch 92 setting is also selected based upon the calculated motor voltage, as described below.

FIG. 5 also shows the manner in which the motor 50 may be actuated to provide decelerating torque to the drive rollers. In this embodiment during application of decelerating torque the pulse width modulator is switched out and that motor terminal is connected to ground. A microprocessor responsive switching assembly 92 has a first operating state in which motor 50 is connected to neither battery 90 nor ground 93; a second operating state in which motor 50 is connected to ground 93 only; and a third operating state in which motor 50 is connected (in reverse) to battery 90 only. The switch is placed in a selected operating state by a control signal from microprocessor 122. In the first operating state the motor 50 is "free-wheeling" and provides no significant torque to the drive rollers. In the second operating state a first negative torque is provided by the motor. In the third operating state a second relatively larger magnitude negative torque is provided by the motor. In both the second and third operating states, the negative torque increases in magnitude with roller speed since generator output increases with speed. Such an assembly may be used to implement the control philosophy of FIG. 6. In an alternative embodiment, a variable resistance switching assembly connecting motor 50 and battery 90 is used to provide a selectively variable negative torque. In the control system shown in FIG. 5 in an alternative preferred embodiment, deceleration torque is produced using the pulse width modulator in conjunction with appropriate switch setting.

In one preferred embodiment, the battery 90 is an onboard battery and provides electrical energy to all of the scanner components which use electrical energy.

Another function that the microprocessor 122 must perform is to interrupt the line selector 102 on every encoder rising edge, i.e. every 13.123 mm of scanner travel, and instruct the line selector to select a line of scan data to process and store the line scan data (in mass storage 119) for final image output as indicated at 121. In a preferred embodiment, the line selector will select two lines of data, the one immediately before and the one immediately after the encoder pulses, for example, and average the data from the two lines selected. This embodiment produces a more precise image than a single line per pulse.

In a preferred embodiment, the position counter 116, the differentiator 117, the clock 118, the RAM 120, the mass storage 119, the microprocessor (or DSP) 122, the switch 92 and the pulse width modulator 123 would all be implemented in an Application Specific Integrated Circuit (ASIC), which would save space and allow for a smaller, lighter scan device. Also, designing the above speed control circuitry into an ASIC would result in significant manufacturing and component cost savings during mass production.

The image signal produced by the above described method and apparatus may be internally stored on a mass storage device 119 mounted within the scanner housing and may also be transmitted to attached devices such as a personal computer (not shown) for further processing (e.g. OCR) or for storage on suitable media such as a hard drive, floppy disk or ROM disk; or for providing a visual display such as through an attached CRT or printer.

Figure 8:
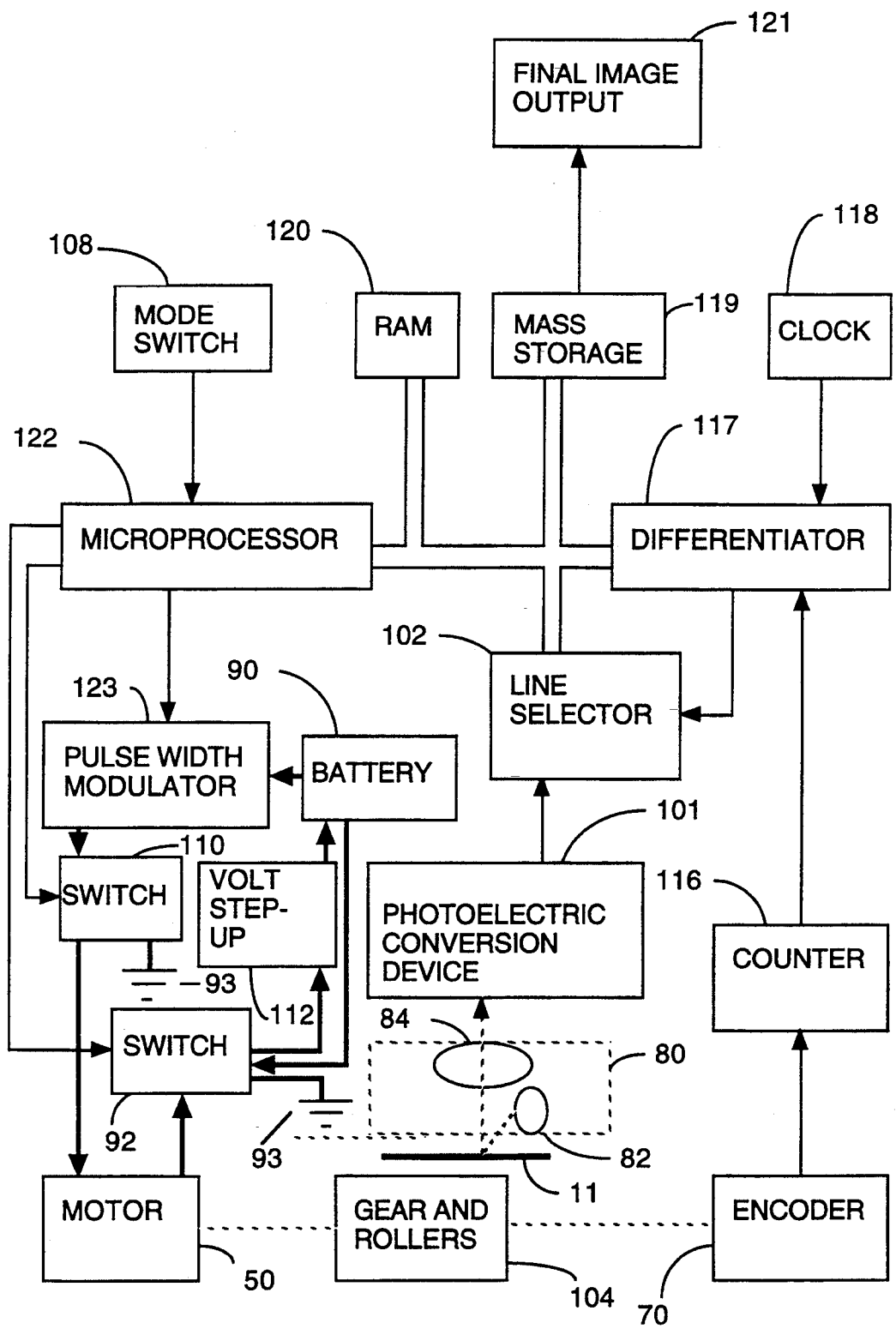
FIG. 8 is a block diagram showing the basic operating components of a hand-held scanner provided with a speed control system and a battery charging system.

FIG. 8 illustrates a control assembly for a hand-held optical scanner which is provided with a battery charging system as well as a speed control system. The control assembly is identical to that previously described with reference to FIG. 5, except for the addition of certain components which allow the hand-held optical scanner to be operated in a battery charging mode of operation. In the battery charging mode of operation, the DC motor has mechanical energy supplied to it and acts as a generator to supply electrical energy to the battery.

A mode switch 10B may be provided on the housing and allows an operator to switch between the speed control mode of operation previously described, and a battery charging mode of operation described below.

A microprocessor responsive switch assembly 110 is provided between pulse width modulator 123 and DC motor/generator 50. Switch 110 is actuated by a command signal from the microprocessor 122 to electrically connect the pulse width modulator 123 with DC motor/generator 50 to enable the motor to receive driving energy supplied from battery 90 through the pulse width modulator 123 during the speed control mode of operation. Switch 110 is also actuated by microprocessor 122 to switch the pulse width modulator 123 to ground to prevent the motor from receiving driving energy from the battery 90 during the battery charging" mode of operation.

Switch 92 in the embodiment of FIG. 8 is a three-way switch which is responsive to switching commands from microprocessor 122. In addition to the switching states previously described with reference to FIG. 5, switch 92 in the embodiment of FIG. 8 also comprises a third switched state associated with the battery changing mode of operation in which the leads of motor 50 are connected through a voltage step-up device 112 to the poles of battery 90 in a reverse configuration from that used to provide driving energy to DC motor 50. Voltage step-up devices 112 are conventional electrical devices well known in the art.

In the battery charging mode of operation, microprocessor 122 actuates switch 110 to disconnect the motor from energy receiving relationship with battery 90. In this battery charging mode of operation, the microprocessor actuates switch 92 to connect the motor through the voltage step-up device to battery 90 such that battery 90 is charged by electrical energy generated by DC motor/generator 50 when it is operating at a sufficiently high angular velocity. The mechanical energy used to drive the DC motor/generator in the battery charging operating state is provided by gear and roller assembly 104 as the scanner is moved by hand across a surface by the operator.

In one preferred embodiment of the invention, two conditions must be met before the microprocessor 122 will issue commands to switch assemblies 110 and 92 to place the scanner in the battery charging operating mode. The first condition which must be met is that the operator must select the battery charging operating mode by use of selection switch 108. The other condition which must be met is that the scanner gear and rollers assembly 104 must be operating above a predetermined minimum speed necessary to provide a sufficiently high voltage for charging the battery 90. The components used to generate a speed signal are described above with reference to FIG. 5. The predetermined speed of the gear and roller assembly is a function of the gear and roller assembly gear ratio and is also a function of the step-up ratio provided by the voltage step-up device 112. Thus, charging of the battery is terminated whenever motor/generator 50 speed falls below a preset value and is resumed when the speed again exceeds the preset value.

In another embodiment of the invention in which the optical scanner is not provided with a speed control system, the mode switch 108, the pulse width modulator 123 and switch 110 may be eliminated and switch 92 is a microprocessor operable two-way switch used to connect generator 50 either to the voltage step-up device 112 when generator 50 rotation is sufficiently high or ground 93 when it is not.

It is contemplated that the inventive concepts herein described may be variously otherwise embodied and it is intended that the appended claims be construed to include alternative embodiments of the invention except insofar as limited by the prior art.

What is claimed is:

1. A hand-held optical scanner comprising:
   a) hand-displaceable housing means for supporting operating components of said optical scanner;
   b) scanner electrical components mounted within said housing means for performing scanner operating functions;
   c) battery means disposed in said housing for supplying electrical energy to said scanner electrical components;
   d) generator means for supplying electrical energy to charge said battery means;
   e) roller means rotatably mounted on said housing means and drivingly linked to said generator means for providing driving torque to said generator means.

2. The invention of claim 1 further comprising switching means for selectively electrically connecting said battery means with said generator means in a first switched state and for disconnecting said battery means from said generator means in a second switched state.

3. The invention of claim 2 further comprising:

roller speed sensing means for generating a data signal representative of the speed of rotation of said roller means and generating a signal representative thereof;

controller means responsive to said roller speed sensing signal for issuing control commands for switching said switching means between said first and second states at predetermined roller speeds.

4. The invention of claim 3 wherein said generator means comprises a DC motor operated in reverse.

5. A hand-held optical scanner comprising:
a) hand-displaceable scanner housing;
b) scanner electrical components mounted within said housing for performing scanner operating functions;
c) a battery disposed in said housing and electrically connected to said electrical components;
d) a generator disposed in said housing and operatively associated with said battery; and
e) a roller assembly mounted in said housing and drivingly linked to said generator.

6. The invention of claim 5 further comprising a switching assembly electrically connecting said battery with said generator and having a first switched state in which said battery is electrically disconnected from said generator and a second switched state in which said battery is electrically connected with said battery.

7. The invention of claim 6 further comprising:
a roller assembly speed sensor; and
a controller operatively associated with said roller assembly speed sensor, said controller issuing control commands switching said switching assembly between said first and second switched states at predetermined roller assembly speeds.

8. The invention of claim 7 wherein said generator comprises a DC motor operated in reverse.

9. A method of producing data representative of a scanned object with a hand-held scanner comprising the steps of:
a) providing energy from a battery for generating a data signal representative of imaged portions of the object;
b) providing energy to charge the battery with a generator; and
c) driving the generator with a roller assembly mounted on the hand-held scanner.

10. The method of claim 9 wherein the step of providing energy to charge the battery with a generator comprises providing energy to charge the battery through use of mechanical energy provided by the roller assembly to a DC motor operating in reverse.

11. The method of claim 10 comprising the further step of electrically disconnecting the battery from energy receiving relationship with the motor when the roller assembly is operated under predetermined, relatively low speed, operating conditions.

12. The method of claim 11 comprising the further step of electrically reconnecting the battery into energy receiving relationship with the motor when the roller assembly is operated under predetermined, relatively high speed, operating conditions.

* * * * *